(12) United States Patent
Kan

(10) Patent No.: US 7,652,300 B2
(45) Date of Patent: Jan. 26, 2010

(54) APPARATUS FOR FORMING AN ASYMMETRIC ILLUMINATION BEAM PATTERN

(75) Inventor: Peter Kan, North Vancouver (CA)

(73) Assignee: Koninklijke Philips Electronics, N.V., Eindhoven (NL)

( * ) Notice: Subject to any disclaimer, the term of this patent is extended or adjusted under 35 U.S.C. 154(b) by 310 days.

(21) Appl. No.: 11/069,388

(22) Filed: Feb. 28, 2005

(65) Prior Publication Data

US 2005/0205878 A1    Sep. 22, 2005

Related U.S. Application Data

(60) Provisional application No. 60/547,437, filed on Feb. 26, 2004, provisional application No. 60/557,394, filed on Mar. 30, 2004.

(51) Int. Cl.
*H01L 33/00*      (2006.01)
(52) U.S. Cl. .......................... 257/98; 257/95; 257/432; 257/435; 257/E33.001
(58) Field of Classification Search .................. 362/241, 362/242, 252, 551, 800; 257/79, 98, 432, 257/435, 95, 116, 436
See application file for complete search history.

(56) References Cited

U.S. PATENT DOCUMENTS

| | | | |
|---|---|---|---|
| 4,158,222 A | 6/1979 | Cook | |
| 5,795,057 A | 8/1998 | Weigert | |
| 5,924,788 A | 7/1999 | Parkyn, Jr. | |
| 6,116,748 A | 9/2000 | George | |
| 6,394,626 B1 | 5/2002 | McColloch | |
| 6,416,200 B1 | 7/2002 | George | |
| 6,502,956 B1 | 1/2003 | Wu | |
| 6,558,021 B2 | 5/2003 | Wu et al. | |
| 6,566,824 B2 | 5/2003 | Panagotacos et al. | |
| 6,590,233 B2 * | 7/2003 | Sugawara | 257/90 |
| 6,641,880 B1 | 11/2003 | Deyak et al. | |
| 6,655,060 B2 | 12/2003 | Grate et al. | |
| 6,987,613 B2 * | 1/2006 | Pocius et al. | 359/565 |
| 2001/0033726 A1 * | 10/2001 | Shie et al. | 385/133 |
| 2003/0063463 A1 | 4/2003 | Sloan et al. | |

(Continued)

FOREIGN PATENT DOCUMENTS

EP        0633163        1/1995

(Continued)

OTHER PUBLICATIONS

Author Unknown, "iColor Cove", Color Kinetics Incorporated, 6 pages, 2002.

(Continued)

*Primary Examiner*—Wai-Sing Louie

(57) ABSTRACT

The present invention provides an apparatus for forming an asymmetric illumination beam pattern that can be advantageous when illuminating channel letters in addition to enabling the creation of cove lighting, as well as other applications benefiting from asymmetric illumination patterns. The apparatus comprises one or more light-emitting elements for creating the illumination. A first optical element is operatively associated with each of the light-emitting elements and provides a means for manipulating the illumination in a first direction. A second optical element is operatively associated with predetermined light-emitting elements and provides a means for manipulating the illumination in a second direction. Upon the interaction of the illumination with both the first and second optical elements, the illumination being created can have an asymmetric beam pattern.

21 Claims, 14 Drawing Sheets

U.S. PATENT DOCUMENTS

| | | |
|---|---|---|
| 2003/0067789 A1 | 4/2003 | Velez |
| 2003/0099115 A1* | 5/2003 | Reill .......................... 362/555 |
| 2003/0156416 A1* | 8/2003 | Stopa et al. ................. 362/294 |
| 2003/0218192 A1 | 11/2003 | Reilly et al. |
| 2006/0050526 A1* | 3/2006 | Ikeda et al. ................. 362/555 |

FOREIGN PATENT DOCUMENTS

| | | |
|---|---|---|
| EP | 1363068 | 11/2003 |
| WO | WO 99/08042 | 2/1999 |
| WO | WO 99/50596 | 10/1999 |

OTHER PUBLICATIONS

Supplementary European Search Report, European Patent Application No. 05714545.0, Mar. 6, 2007.

* cited by examiner (a)

(b)

APPARATUS FOR FORMING AN ASYMMETRIC ILLUMINATION BEAM PATTERN

INCORPORATION BY REFERENCE

The present application claims the benefit of U.S. provisional patent application No. 60/547,437, filed Feb. 26, 2004, and U.S. provisional patent application No. 60/557,394, filed Mar. 30, 2004, both of which are hereby incorporated herein by reference.

FIELD OF THE INVENTION

The present invention relates to the field of lighting and more specifically to forming an asymmetric illumination beam pattern of light created by light-emitting elements.

BACKGROUND

Channel letters are used to provide signage for buildings, shopping malls, and the like where it is desirable that the signage comprises illuminated letters or any other shapes that are easily seen, even at great distances, day or night. Each channel letter generally comprises an enclosure usually a metal box, having a rear surface which is positioned against a raceway, or the wall of a building, on which the signage is mounted and a plurality of sides which define the figuration of a letter, number or symbol which make up a portion of the sign. A light source, such as a neon tube, fluorescent tube or a series of light-emitting diodes (LEDs) is positioned within the walls of the enclosure and attached to the rear surface to provide illumination for the letter. The enclosure typically has one translucent surface through which the light is emitted.

When LEDs are used as the light source in channel letters, they effectively behave as point sources, thus creating bright, localized regions referred to as hot spots that are visible through the translucent surface. Such hot spots are distracting and aesthetically displeasing. This effect has been reduced by the use of diffuse films, for example, as disclosed in U.S. Pat. No. 6,641,880. Conventional channel letter LED systems, which typically use surface mounted LEDs on a printed circuit board (PCB) with little or no optics as illustrated in FIG. 1. These systems however, rely on the highly reflective surfaces of the adjacent walls 20 to transfer the light from the LEDs 22 to the emitting surface 21 as illustrated in FIG. 2. The problem with this type of system is that over time the surfaces of the walls can be contaminated with dirt or debris due to water ingress, for example. This can lower the reflectivity of the wall material and thus reduce the amount of reflected light from the LEDs or other light source to the translucent emitting surface.

FIG. 3 illustrates a beam pattern 34 typically produced by LEDs 32, wherein this beam pattern is radially symmetrical. When these LEDs are positioned within a channel letter application, they typically do not provide sufficient uniformity of illumination for the entire channel letter, thereby resulting in dark regions 36. In order to reduce the size of these dark regions, the LEDs can be closely spaced together, however this closer proximity of the LEDs may not be desired. Furthermore, when high flux LEDs are used for channel letter applications, typically fewer LEDs are used to illuminate a channel letter due to the higher level of irradiation generated by these devices. With a reduction in the number of LEDs 42 that produce radially symmetrical beam patterns 44 for illuminating a channel, extreme darks regions 46 may result as illustrated in FIG. 4.

In addition, for narrow channel letters, as is common with letters formed using serif fonts, for example, it can be difficult to fill the narrow regions of this type of letter with light due to its tight geometry as illustrated by locations 30 in FIG. 5.

Some manufacturers offer an optic or lens, which alters the beam angle such that the number of interactions of light rays striking the wall surface is reduced. However, this configuration typically does not provide sufficient light to the narrow regions of channel letters. In addition, these forms of optics typically increase the beam angle of the emitted radiation in a radially symmetrical fashion.

U.S. Pat. No. 6,566,824 references a technique that utilizes an optical element in front of the LED to vary the spread of the emitted light. The optical element is essentially an encasing around the LED where, for example, conventional bullet-shaped lenses, flat tops and BugEye™ lenses are used as the optical element.

U.S. Pat. No. 6,416,200 discloses a technique for illuminating the tread area and the edges of steps or stairs, especially in business establishments such as theatres and restaurants, where the steps or stairs may be in dark or dimly light areas. This technique however, provides a means for detachably mounting a light strip assembly to enable angular adjustment of the emitted light through a predetermined angle.

In addition, Fraen Corporation manufactures an optic that collimates light and this product is illustrated in FIGS. 6a and 6b. Light from an LED strikes two front surfaces, one being spherical 32 and the other being conical 34. Light striking the spherical surface is collimated and light striking the conical surface is refracted and subsequently strikes the parabolic surfaces 36 of the optic. This light total internally reflects within the optic thereby providing a collimated beam of light. Additionally, as illustrated in FIG. 6b an additional optical element may be included wherein this additional optic can be a concave surface 38 which can be used to produce an elliptical beam distribution. These optical configurations however, do not provide sufficient light or illumination to areas with tight geometries, for example, however this product may be used in a light grazing application.

Grazing luminaries illuminate a surface that is parallel to the general direction of the emitted light. Aesthetics can demand that the luminaire be placed as close as possible to the surface to be illuminated. This configuration can pose a challenge as most optics are designed to distribute light symmetrically around at least one axis, resulting in wasted light that does not reach the surface to be illuminated. The conventional solution to this problem is to angle the light source towards the surface, resulting in more light reaching the surface. This solution however, is not optimal as it creates a non-uniform wash of light that can result in a hot spot located at the centre axis of the beam distribution pattern.

Therefore, there is a need for an apparatus and method for forming an asymmetric illumination beam pattern thereby enabling for example, the illumination to tight geometry areas and/or increasing the efficiency of emitted light in applications such as channel letters, in addition to enabling the generation of uniform illumination of a surface in close proximity to the light sources.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an apparatus for forming an asymmetric illumination beam pattern. In accordance with an aspect of the present invention, there is provided an apparatus for forming an asymmetric beam pattern for illumination generated by one or more light-emitting elements, said apparatus comprising: a first optical element optically connected with each of the one or more light-emitting elements, said first optical element manipulating the illumination in a first direction; a second optical element optically connected with one or more predetermined light-emitting elements selected from the one or more light-emitting elements, said second optical element for manipulating the illumination created by the one or more predetermined light-emitting elements in a second direction; thereby forming an asymmetric illumination beam pattern.

BRIEF DESCRIPTION OF THE FIGURES

FIG. 6a shows collimating lenses that yield a symmetrical beam distribution as produced by Fraen Corporation.

FIG. 6b shows an optical lens with a concave feature for yielding an "elliptical" beam distribution similar to that illustrated in FIG. 6a.

FIG. 10 shows a top view of an embodiment illustrating the positioning of individual light-emitting elements for an optic according to FIG. 9a.

FIG. 15a shows a top view of an optic incorporating Fresnel prisms for creating of an asymmetrical beam pattern according to one embodiment of the present invention.

FIG. 15b shows a radiation pattern created by a light-emitting element optically coupled to the optic of FIG. 15a.

FIG. 16a shows a lenticular lens optic for creating an asymmetrical beam pattern according to one embodiment of the present invention.

FIG. 16b shows an example configuration of light-emitting elements for association with the optic of FIG. 16a.

FIG. 20a shows a luminous intensity distribution of one embodiment of the present invention where a parabolic reflector design yields an asymmetric illumination pattern with a wide beam angle.

FIG. 20b shows the representative planes with regard to FIG. 20a.

DETAILED DESCRIPTION OF THE INVENTION

Definitions

The term "light-emitting element" is used to define any device that emits radiation in the visible region of the electromagnetic spectrum when a potential difference is applied across it or a current is passed through it, for example, a semiconductor or organic light-emitting diode (LED or OLED, respectively) or other similar devices as would be readily understood. It would be obvious to one skilled in the art that elements that emit other forms of radiation such as infrared or ultraviolet radiation may also be used if desired in the present invention in place of or in combination with light-emitting elements.

The term "beam angle" is used to define an angle which is equivalent to twice the angle between the emitted radiation and the plane normal to the exiting surface at which the intensity of the light source is one-half of its intensity at the plane normal.

Unless defined otherwise, all technical and scientific terms used herein have the same meaning as commonly understood by one of ordinary skill in the art to which this invention belongs.

The present invention provides an apparatus for forming an asymmetric illumination beam pattern that can be advantageous when illuminating channel letters in addition to enabling the creation of cove lighting, as well as other applications benefiting from asymmetric illumination patterns. The apparatus comprises one or more light-emitting elements for creating the illumination. A first optical element is operatively associated with each of the light-emitting elements and provides a means for manipulating the illumination in a first direction. A second optical element is operatively associated with predetermined light-emitting elements and provides a means for manipulating the illumination in a second direction. Upon the interaction of the illumination with both the first and second optical elements, the illumination being created can have an asymmetric beam pattern. In one embodiment of the present invention, the first and second directions are perpendicular, and therefore the apparatus can provide a means for manipulating the illumination in two independent directions.

Figure 1:
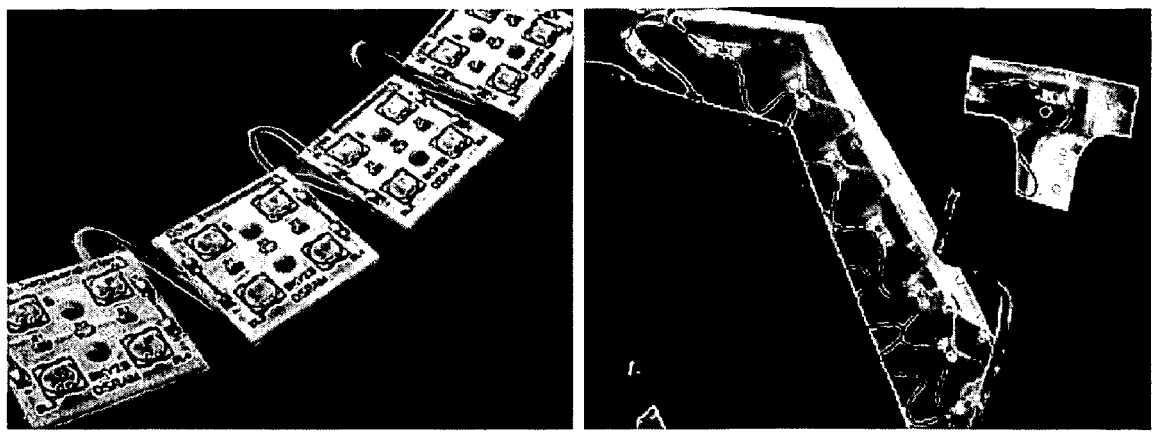
FIG. 1 shows light-emitting diodes (LEDs) surface mounted on printed circuit boards (PCBs) that are flexibly interconnected according to the prior art.
Figure 2:
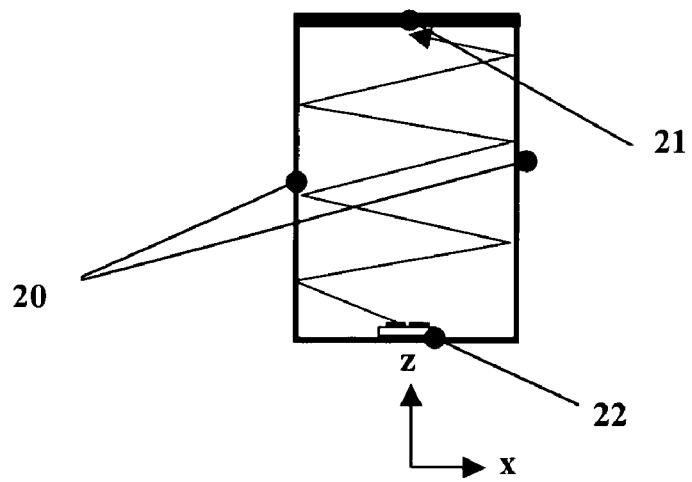
FIG. 2 shows a channel letter structure that relies on reflective surfaces of the adjacent walls to transfer the light from the light-emitting diodes to the emitting surface according to the prior art.
Figure 3:
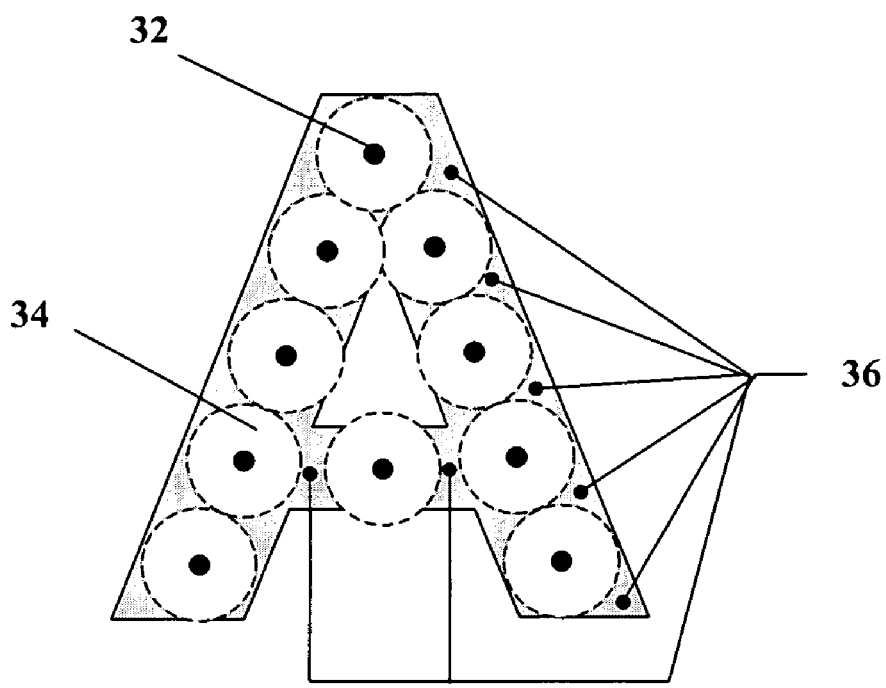
FIG. 3 shows symmetrical illumination pattern and dark regions in a channel letter illuminated using a plurality of LEDs according to the prior art.
Figure 4:
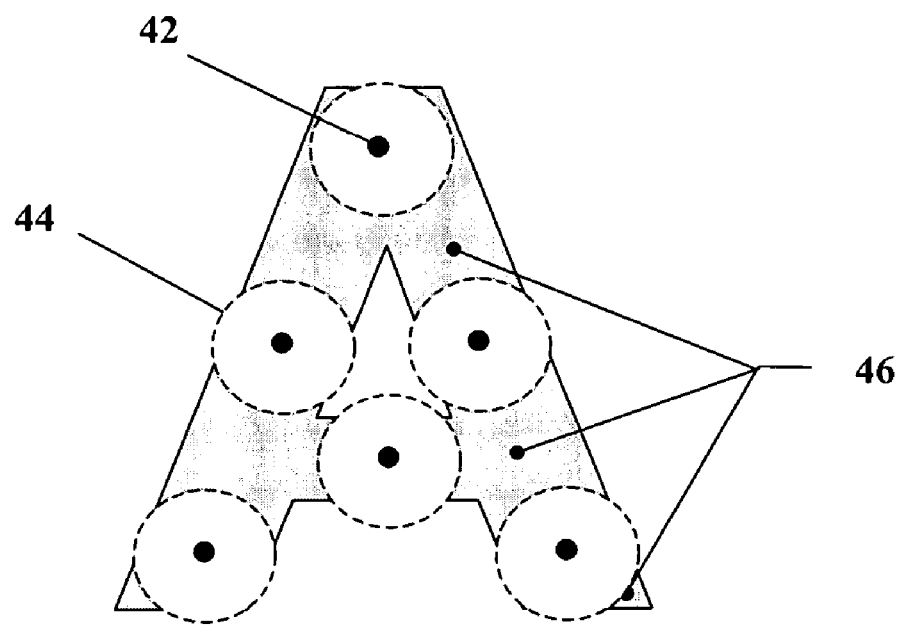
FIG. 4 shows symmetrical illumination pattern and dark regions in a channel letter illuminated using a plurality of high flux LEDs according to the prior art.
Figure 5:
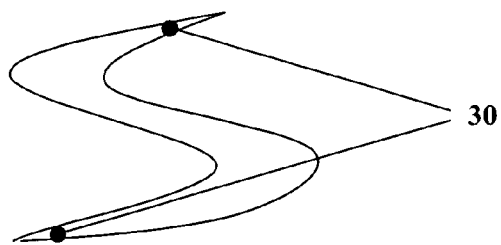
FIG. 5 shows a channel letter with narrow regions that can be difficult to illuminate.
Figure 7:
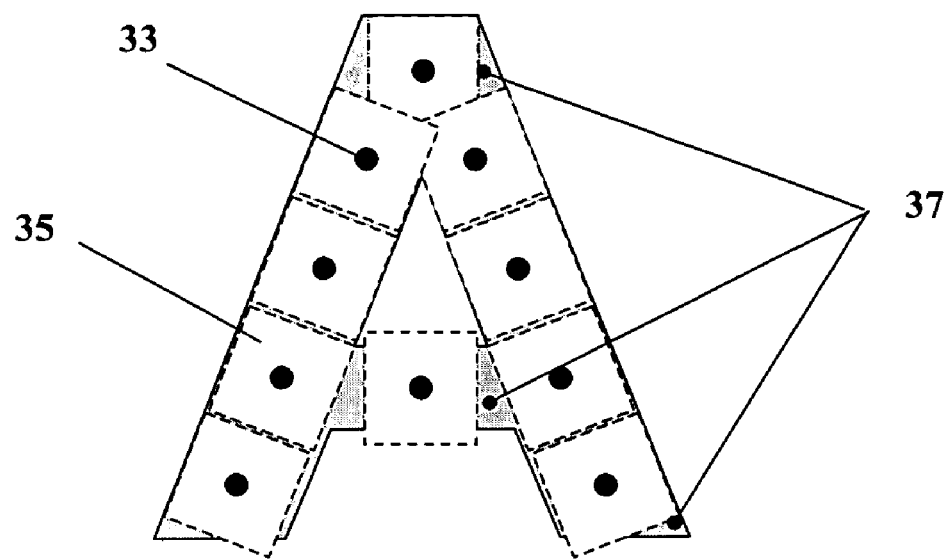
FIG. 7 shows a beam pattern of light-emitting elements provided in a channel letter, wherein the beam pattern is generated according to one embodiment of the present invention.
Figure 8:
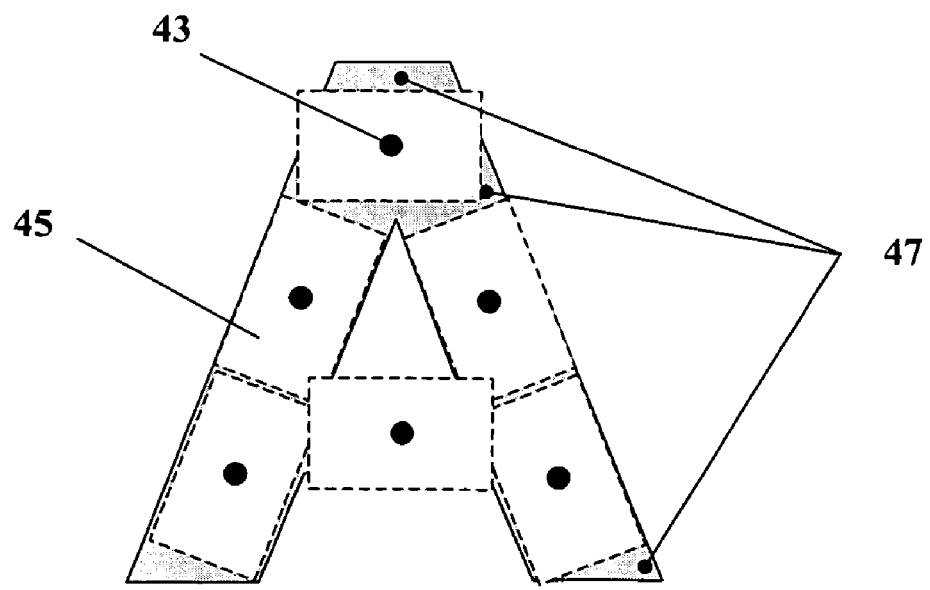
FIG. 8 shows a beam pattern of high flux light-emitting elements provided in a channel letter, wherein the beam pattern is generated according to one embodiment of the present invention.

In one embodiment of the present invention, the first and second optics associated with the light-emitting elements provide a means for creating an asymmetrical rectangular beam pattern as illustrated in FIGS. 7 and 8. In particular, FIG. 7 illustrates a rectangular or square beam pattern 35 created by the light-emitting elements 33, thereby aiding in the reduction of the perceived dark regions 37, when compared to a configuration as illustrated in FIG. 3. In addition FIG. 8 illustrates a rectangular beam pattern 45 generated by first and second optics associated with the light-emitting elements 43. When comparing the dark regions 46 within a channel letter as illustrated in FIG. 4, with the dark regions 47 of a similarly configured channel letter comprising the present invention, it is evident that the dark regions illustrated in FIG. 8 are decreased over those as illustrated in FIG. 4.

Figure 9:
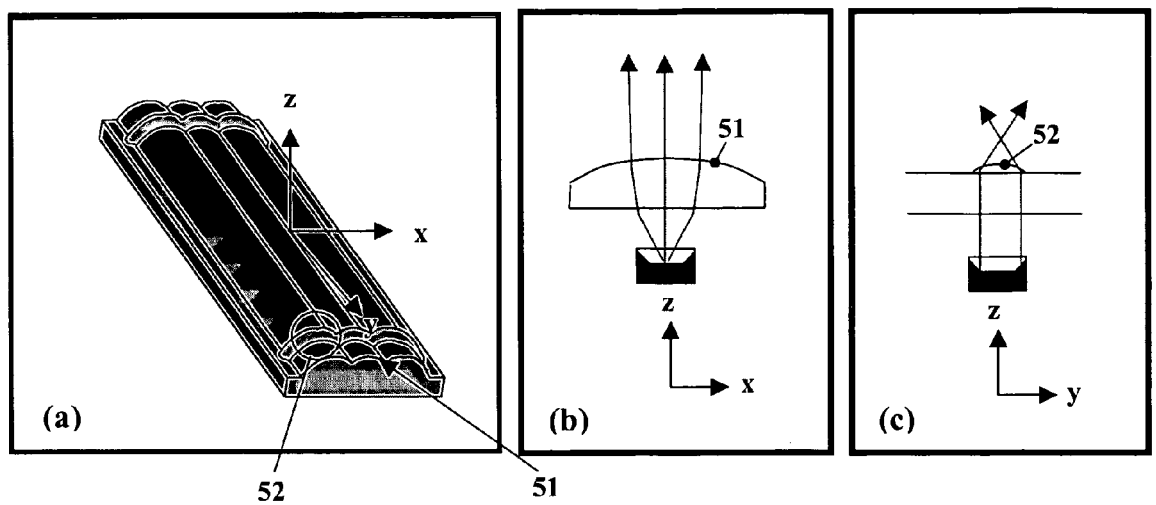
FIG. 9a shows one embodiment of the present invention with a standard "pillow" or lenticular lens and a toroidal lens.
FIG. 9b shows one embodiment of the present invention wherein a lenticular lens decreases the beam spread in the x-direction.
FIG. 9c shows one embodiment of the present invention wherein a toroidal lens increases the beam spread in the y-direction.
Figure 10:
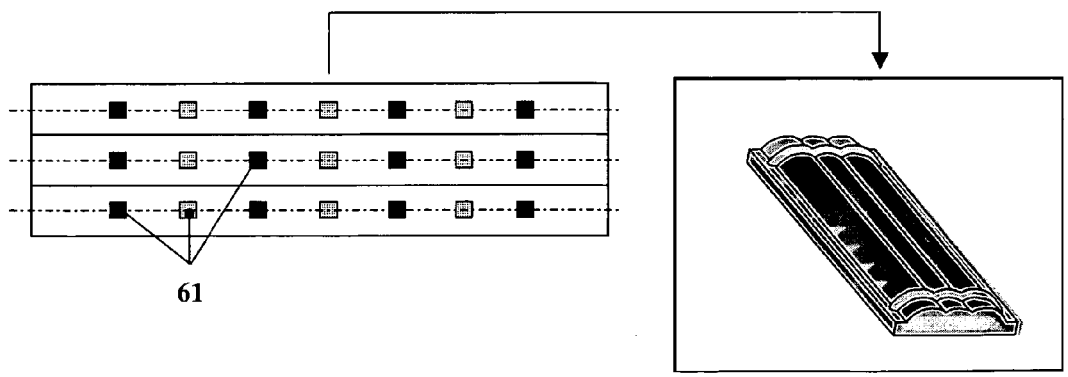

In one embodiment of the present invention and having regard to FIG. 9a, the apparatus comprises two optical elements 51 and 52 that are oriented such that they manipulate illumination in perpendicular directions, namely the x and y directions. In this embodiment, the first optical element 52, reduces the beam spread in the x-direction as illustrated in FIG. 9b, while the second optical element 51 increases the beam spread in the y-direction as illustrated in FIG. 9c. This embodiment, when applied to channel letter illumination for example, can provide a means for reducing the interaction of the illumination with the typically reflective side walls of the channel letter, while providing a means for illuminating narrow regions of the channel letter. A top view of the light-emitting element configuration for use with the embodiment of FIG. 9a is illustrated in FIG. 10, which indicates a potential configuration of the individual light-emitting elements 61. It would be obvious to a worker skilled in the art that an individual light-emitting element may be replaced with an array of light-emitting elements.

First Optical Element

The function of the first optical element is to intercept light emitted by the one or more light-emitting elements in a first direction and manipulate this light such that the beam spread is reduced. Light emitted from the light-emitting elements with relatively small beam angles can pass through this optic with little or no deviation, whereas light with relatively large beam angles will be refracted such that their beam angles are reduced thus providing an overall reduction in the beam spread of the emitted radiation in a first direction. The first optical element may be larger in cross sectional size when compared to the cross section of the light-emitting element in order to allow manipulation of light with relatively large beam angles.

Having particular regard to channel letters, reduction of the beam angle of the emitted light can result in fewer light beams reflecting off the walls as compared to light-emitting elements without associated optics. Therefore, in this case where a first optical element is associated with a light-emitting element, a greater amount of radiation can be emitted towards the translucent surface of the channel letter, in particular when the reflectivity of these surfaces is inhibited.

The first optical element can be any optical element that enables the reduction of the beam spread of light as described above, for example a lenticular lens or a "pillow" lens or lenses having characteristics of controlling the beam spread of the output light to specific angles and reducing the amount of stray light emitted above the horizontal plane. In addition, as would be readily understood by a worker skilled in the art, reflectors, such as parabolic reflectors 36 illustrated in FIGS. 6a and 6b, may also be used as the first optical element. This first optical element also typically has a large cross section in order to allow light with relatively large beam angles to be intercepted and subsequently reduced.

In one embodiment, as illustrated in FIG. 9a the first optical element is a standard "pillow" or lenticular lens design 51 that culminates the light in the x-direction. The effect of this lens is the reduction of the beam angle as illustrated in FIG. 9b.

Figure 11:
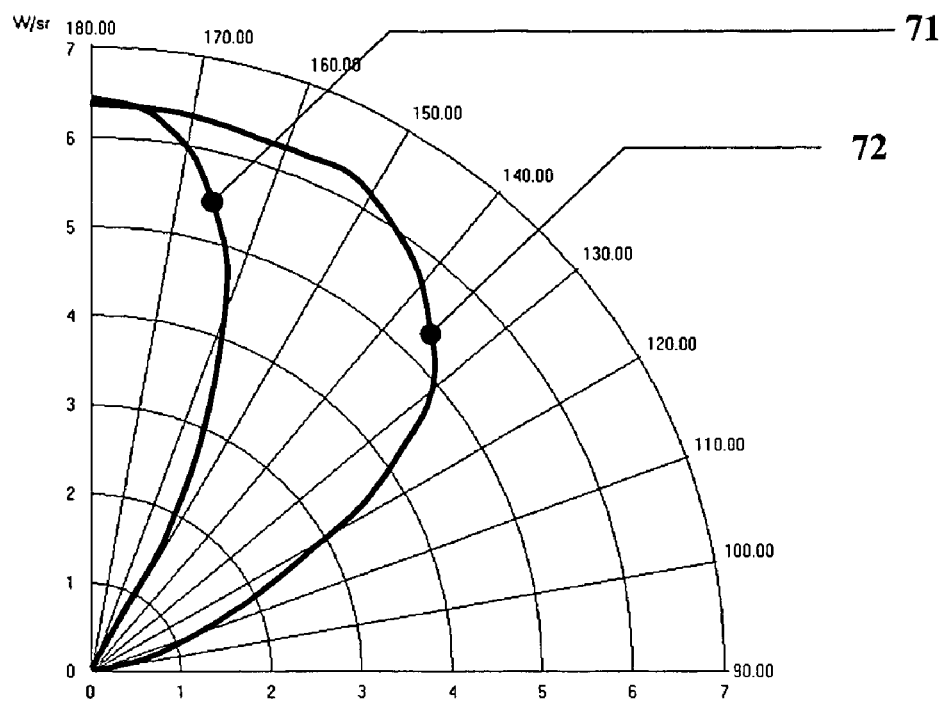
FIG. 11 shows a polar candela distribution plot for one embodiment of the present invention wherein the plot indicates the difference in the distribution with and without a lenticular lens operatively associated with a light-emitting element.

A polar candela plot illustrating the effect of the lenticular lens in FIG. 9b is given in FIG. 11. The plot illustrates the distribution of light emitted from a light-emitting element without being intercepted by a lenticular lens 72 as well as the distribution of light with the lenticular lens 71 positioned in front of the light-emitting element. This plot visibly indicates a reduction in beam angle with the lenticular lens in place.

Second Optical Element

The secondary optic is oriented in order to intercept light emitted by selected one or more of the light-emitting elements in a second direction and has the effect of increasing the beam angle of the light emitted from the one or more light-emitting elements with which it is associated. Light beams with relatively small beam angles are intercepted by the secondary optic and diverged resulting in larger beam angles and thus a larger beam spread. Light beams emitted with relatively large beam angles can experience small or no deviations in beam angle, or may not even be intercepted by the secondary optic.

In one embodiment of the present invention, the secondary optic is positioned such that it interacts with the illumination subsequent to the first optical element on the selected light-emitting elements in a given array of light-emitting elements. This configuration can provide flexibility in modifying the composite beam pattern depending on the position of the light-emitting elements. In addition, this flexibility of allowing the secondary optic to be used with any light-emitting element allows the spacing between light-emitting elements with both the first and second optical elements to be easily varied without necessarily redesigning either of the first or second optical elements.

In one embodiment of the present invention, the first optical element may intercept the light subsequent to its interaction with the second optical element. Therefore, the second optical element would manipulate illumination from selected light-emitting elements prior to manipulation of the illumination by the first optical element.

In one embodiment of the present invention, the first and second optical elements are molded and cast into a single component. In another embodiment, the second optical element may be a separate component that is fastened to the first optical element at desired positions.

Figure 12:
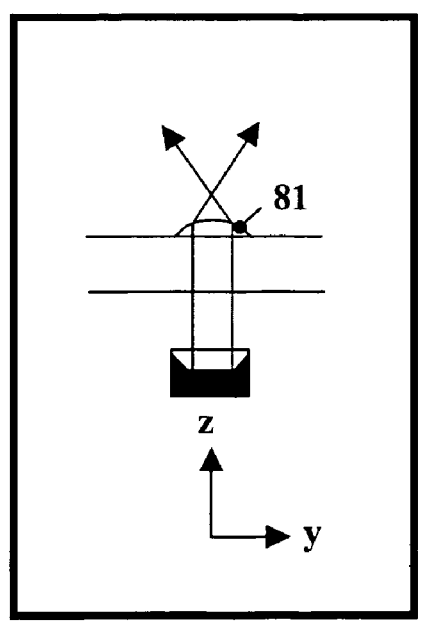
FIG. 12 shows the effect of a toroidal shaped lens on a light beam passing generally perpendicularly through the lens according to one embodiment of the present invention.

The second optical element may be any element that causes divergence of the light emitted by a light-emitting element as described above. In the embodiment illustrated in FIG. 9a, a toroidal shaped lens 52 is used as the second optical element. The diameter of the toroidal shaped lens can be relatively similar in size to the width of the light-emitting element, such that the optic manipulates the portion of the emitted light having a relatively small beam angle and increases this beam angle. Light that is emitted with a relatively large angle from the light-emitting element may thus not be intercepted in this second direction and continue to be radiated with essentially its original divergence. FIG. 9c illustrates the increase in beam angle caused by a toroidal shaped lens in the y-direction. A toroidal shaped lens 81 as illustrated in FIG. 12 can typically cause a beam angle change from approximately 0° to 60°, however this range of beam angle change is dependent on the design of the second optical element and thus may be smaller or larger, as would be readily understood.

Figure 13:
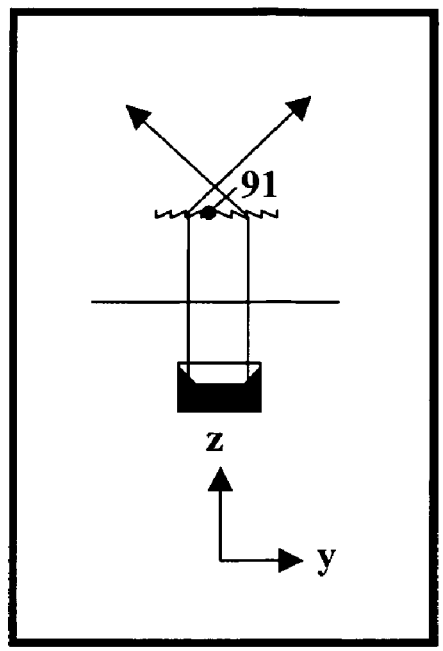
FIG. 13 shows the effect of a linear Fresnel structure on a light beam passing generally perpendicularly through the lens according to one embodiment of the present invention.

In one embodiment a linear Fresnel structure 91 as shown in FIG. 13 can also be used as the second optical element. A Fresnel lens has a series of concentric groves molded into its surface, such that when light beams with small beam angles pass through this lens, the beams are diverged to a larger extent than compared to a toroidal shaped lens. The beam angles are typically increased from approximately 0° to 120°, while larger or smaller ranges are possible depending on the design of the Fresnel lens. In the embodiment illustrated in FIG. 13, the Fresnel lens is used to diverge light in the y-direction.

Figure 14:
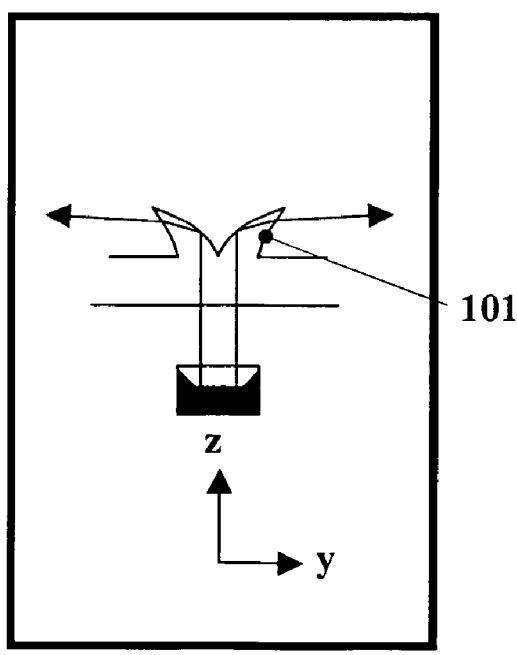
FIG. 14 shows the effect of a total internal reflection (TIR) "light guide" structure on a light beam passing generally perpendicularly through the lens according to one embodiment of the present invention.

In another embodiment, a structure that can be used as the second optical element is a total internal reflection (TIR) "light guide" structure 101 as shown in FIG. 14. This structure can allow for the efficient coupling of the emitted light from the light-emitting element(s) to the emitting surface, in order to increase the beam angle and redirect the light sideways. This structure can cause an extreme beam angle change from approximately 0° to 180°, for example.

Figure 15:
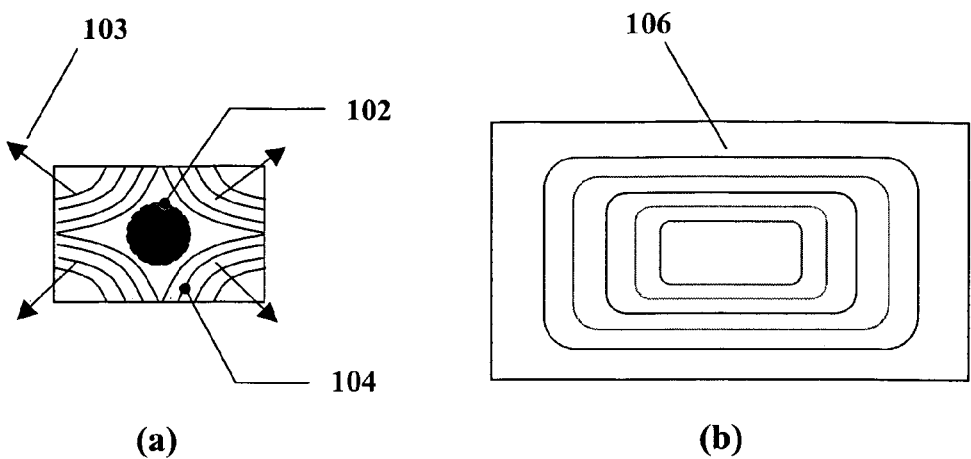

In one embodiment of the present invention as illustrated in FIG. 15a, Fresnel prisms can be used to diffract the light from a light-emitting element to aid in the formation of an asymmetrical rectangular beam pattern 106 as illustrated in FIG. 15b. In particular, having regard to FIG. 15a, the Fresnel prisms 104 can be configured to direct the illumination from a light-emitting element 102 in directions 103 as indicated. Furthermore, as illustrated in FIG. 15a, the Fresnel prisms can be designed in an arc configuration in each quadrant of the optic in order to provide this form of diffraction of the illumination.

In another embodiment of the present invention, as illustrated in FIG. 16a, a lenticular lens can be used to create an asymmetrical beam pattern. In this embodiment, the lenticular lens 109 may be configured to manipulate the illumination created by a multiple light-emitting element configuration in directions 107 as illustrated. An example light-emitting element 108 configuration that can be associated with this embodiment of lenticular lens is illustrated in FIG. 16b. This figure further illustrates directions 105 for the propagation of the illumination for the creation of an asymmetrical rectangular beam pattern.

Figure 17:
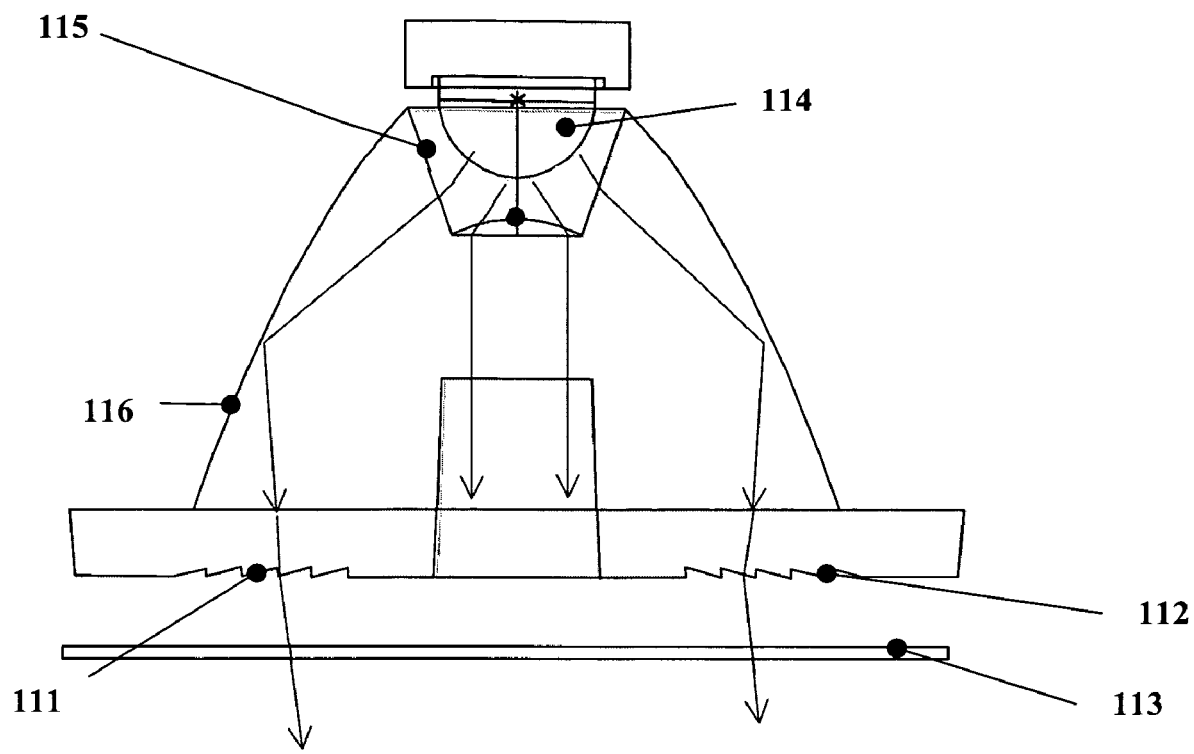
FIG. 17 shows one embodiment of the present invention, in which the first optical element is a parabolic trough reflector and the second optical element is a configuration of two Fresnel lenses, such that one Fresnel lens is designed to refract light to a different extent than a second Fresnel lens.

In one embodiment of the present invention, the second optical element can be a configuration of two Fresnel lenses as illustrated in FIG. 17, in which, one Fresnel lens 111 is designed to refract light to a different extent than a second Fresnel lens 112. In this embodiment, the collimating optical element of FIG. 6b can be used as the first optical element. Light emitted from a light-emitting element first strikes two surfaces, one of which is spherical 114 and second being conical 115. The light hitting the spherical surface of the lens is refracted to yield a collimated beam distribution. The light that refracts at the conical surface 115 strikes the parabolic side surface 116 of the first optical element and total internally reflects also achieving a collimated light beam distribution. This illumination subsequently interacts with Fresnel lenses 111 and 112 thereby adjusting the direction of the illumination. It would be understood that any collimating element can be used as the first optical element as described earlier. The Fresnel lenses are configured to direct light at different angles of emission depending on its proximity to the illuminated surface. Those on the side furthest from the surface, lens 111 direct light towards the centre axis of the light while those nearest the surface lens 112 direct light away from the centre axis. The same effect can be achieved in the reverse, with the nearer Fresnel lens throwing the light further down the surface and the further Fresnel lens throwing the light higher up the wall. The lighting result can be a more uniform wash of light on the surface with a reduction in wasted light.

Figure 18:
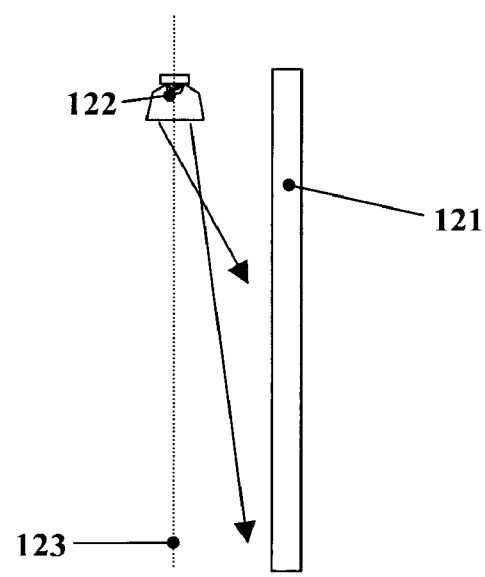
FIG. 18 illustrates the production of "graze" lighting of a surface, such as a wall, that is parallel to the centre axis of the emitting direction of the light source according to one embodiment of the present invention.

This embodiment can allow for the production of "graze" lighting of a surface 121, such as a wall, that is parallel to the centre axis 123 of the emitting direction of the light-emitting element(s) 122 as illustrated in FIG. 18. Each Fresnel lens comprises a plurality of Fresnel prisms and the Fresnel prisms furthest away from the target surface 121 refract the light from the light-emitting element(s) 122 such that it illuminates the portion of the wall that is closest thereto. The Fresnel prisms closest to the target surface 121 refract the illumination light such that they refract the light to create the "grazing" feature and can illuminate the portion of the wall that is furthest away from the light-emitting element(s) 122 as illustrated in FIG. 18. It would be obvious to one skilled in the art that the second optical element may comprise a plurality of Fresnel lenses each refracting light from the light-emitting element(s) a desired degree in order to illuminate a surface of a particular shape or orientation.

With further reference to FIG. 17, in this embodiment a diffusive optic 113 is also employed. This optic may be used, for example, when a light-emitting element is an array of light-emitting elements that emit illumination of different colors such as red, green and blue, and effectively causes mixing of the colors such that a uniform colour of illumination can be obtained for the desired "grazing" affect.

Figure 19:
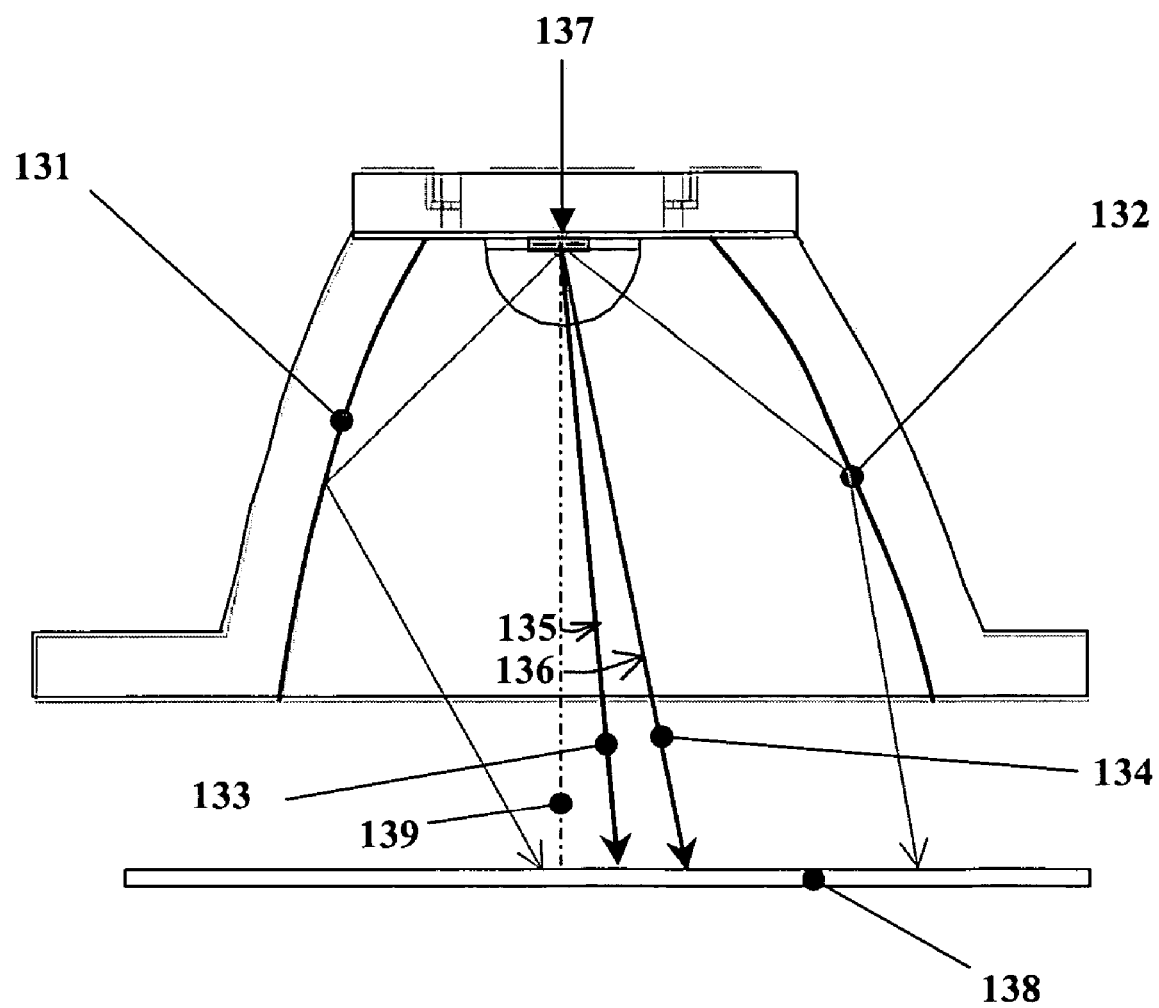
FIG. 19 shows one embodiment of the present invention where a parabolic trough reflector with two compound parabolic surfaces with different tilts, yields an asymmetrical illumination pattern with a wide beam angle.

In one embodiment of the present invention, a reflector with two different compound parabolic surfaces as illustrated in FIG. 19 may be used to project light onto a surface parallel to the centre axis 139 of the emitting direction of the light-emitting element(s) as shown in FIG. 18. In this embodiment, one compound parabolic surface 132, with a first tilt axis 133 has a small tilt angle 135, and the other compound parabolic surface 131, with second tilt axis 134, has a larger tilt angle 136. The parabolic surface 131 with the larger tilt angle 136, reflects the majority of the light that strikes its surface towards the right with a smaller throw, for example about 0 to 4 feet. The parabolic surface with the smaller tilt angle reflects a majority of the light that strikes its surface towards the right with a larger throw, for example about 4 to 8 feet. In addition, a diffusing optic 138 may be used to mix light output from light-emitting elements of varying colours to achieve a homogenous coloured output. In addition, the diffuser can provide a more uniform gradient of light by softening the luminous intensity peaks of the illumination.

Figure 20:
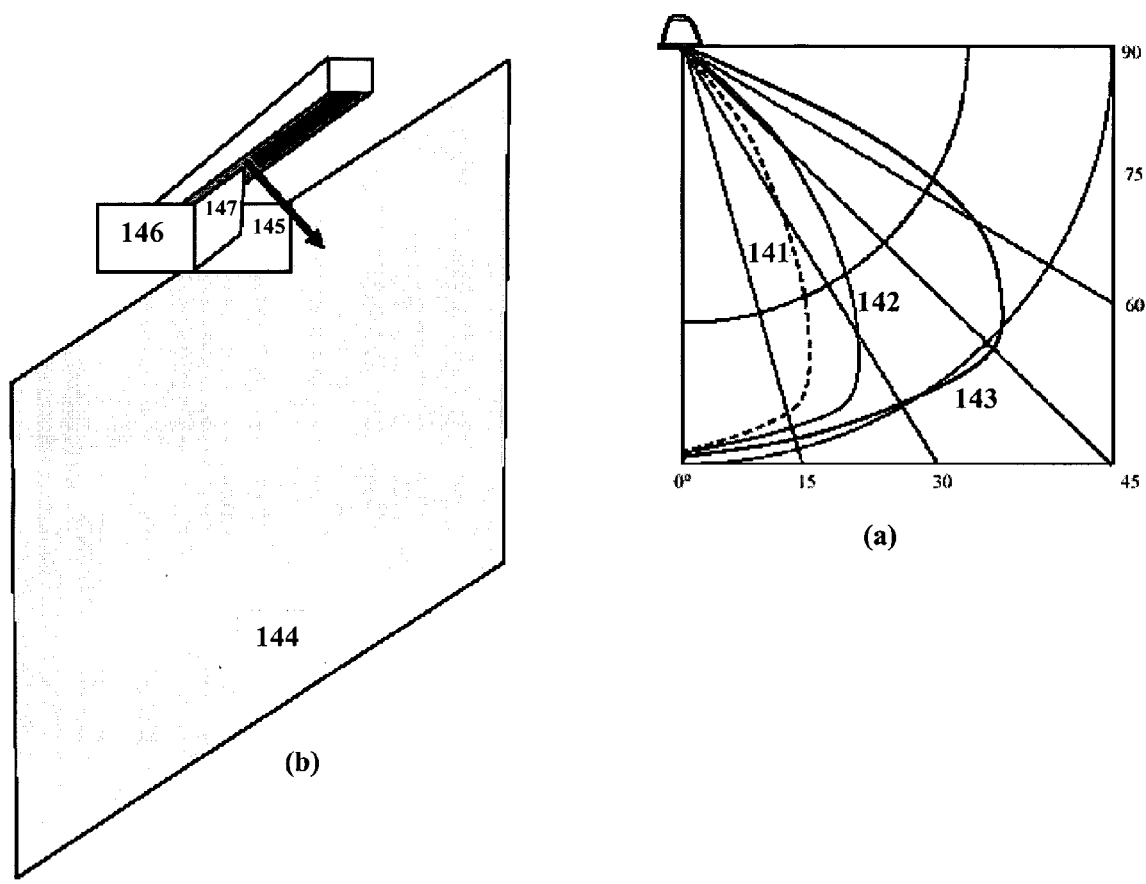

Having regard to the configuration illustrated in FIG. 19, the asymmetry of the projected wide angle beam is illustrated in the luminous intensity distribution plot of FIG. 20b with the target surface and representative planes identified in FIG. 20a. For reference curve 143 represents the luminous intensity distribution for the plane 147 parallel to the target surface 144, curve 142 represents the luminous intensity distribution for the plane 145 towards the target surface 144, and curve 141 represents the luminous intensity distribution for the plane 146 away from the target surface.

Figure 21:
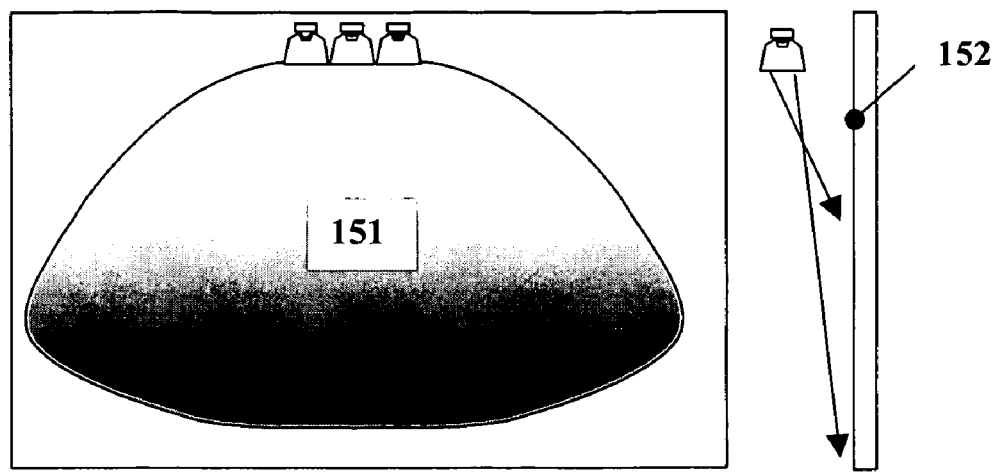
FIG. 21 shows a wide beam projection of one embodiment of the present invention where three parabolic trough reflectors are used and the illumination of a wall surface that is parallel to the centre axis of the emitting direction of the light source.

FIG. 21 illustrates a wide asymmetric illumination pattern 151 projected onto a target surface 152 incorporating three instances of the optical configuration illustrated in FIG. 19.

This embodiment of the present invention may also reduce the amount of light wasted, for example light that does not hit the target surface, through the redirection of a majority of the light from the light emitting elements towards the target surface.

Figure 22:
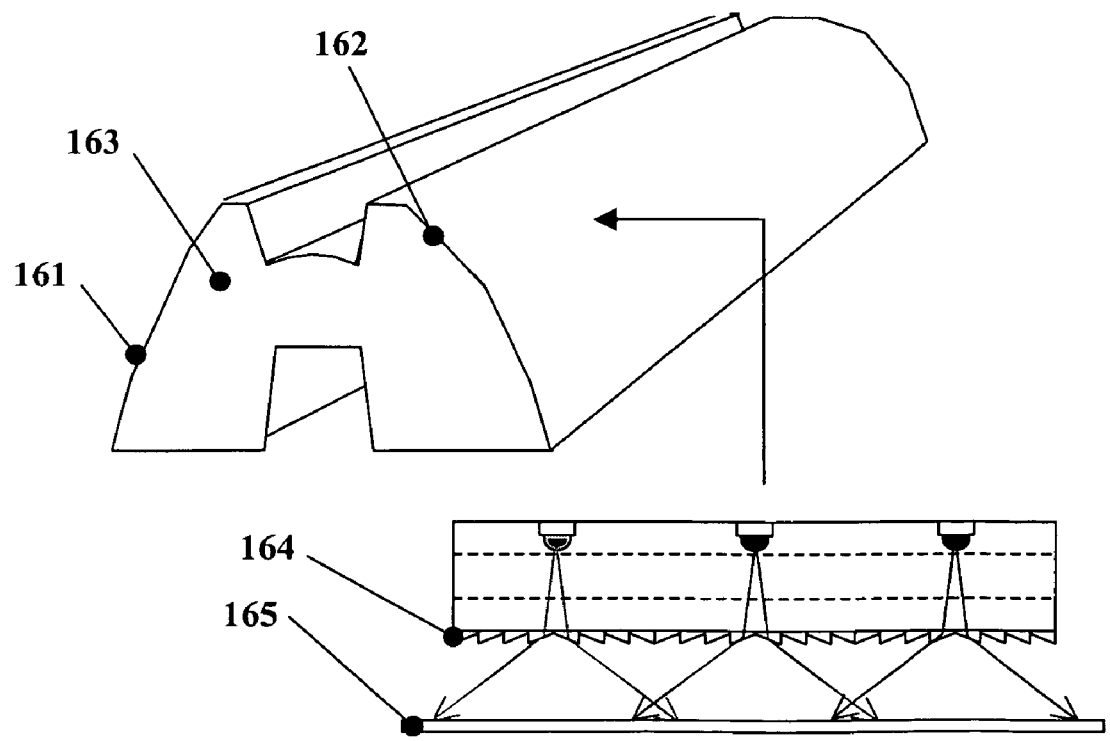
FIG. 22 shows one embodiment of the present invention in which an extruded lens design with two compound parabolic surfaces of different tilt and Fresnel features.

In another embodiment of the present invention, the embodiment illustrated in FIG. 19 may additionally have a further optical element associated therewith, for example a lens with Fresnel features. FIG. 22 illustrates an example of this embodiment with an extruded lens design 163 and the incorporation of Fresnel features 164. For example, the compound parabolic surface 162 can have a smaller tilt angle than the compound parabolic surface 161. The Fresnel features 164 serve to further refract the light towards the target surface, wherein this refraction may be to varying extents as identified for the embodiment illustrated in FIG. 17.

In another embodiment of the present invention, first surface reflective optics can also be used as the second optical element. It would also be obvious to one skilled in the art that a diffusive optic may be used in combination with any configuration of the present invention for purposes such as alleviating hot spots and colour mixing. Examples of diffusive optics include frosted or etched glass, a plastic diffuser with striations running perpendicular to the mixing direction, and a holographically-mastered diffusion film.

In the above description where embodiments of the present invention have been used to illuminate a target surface parallel to the centre axis of the emitting direction of the light-emitting element, it would be understood that target surfaces in varying plane orientations and shapes may also be illuminated using one or more embodiments of the present invention.

Figure 23:
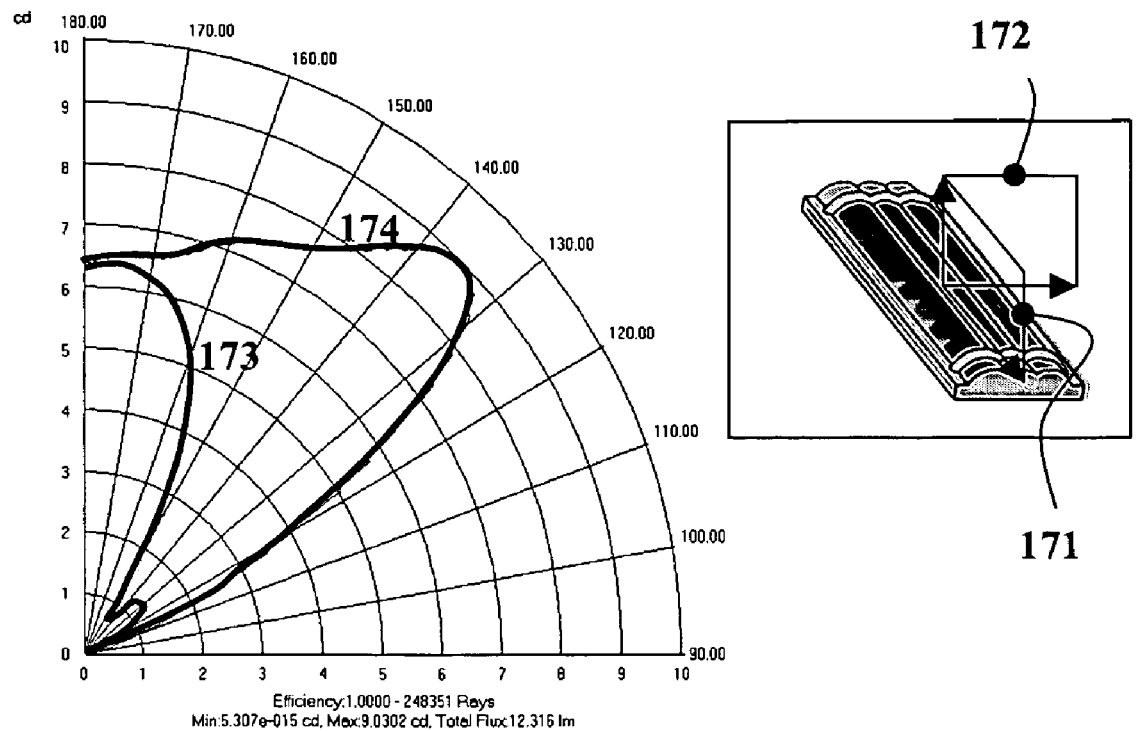
FIG. 23 shows a polar candela distribution plot for the 0° and 90° planes for one embodiment of the present invention wherein a lenticular lens manipulates the illumination in the 0° plane and a toroidal shaped lens manipulates the illumination in the 90° plane.

FIG. 23 shows a polar candela distribution plot for one embodiment of the present invention, wherein a light-emitting element with a first optical element being a lenticular lens used to reduce the beam angle in the x-direction or 90° plane 172, and a second optical element in the form of a toroidal lens is used to diverge the light in the 0° plane or the y-direction 171. In FIG. 23, the 0° plane or the y-direction is illustrated by line 174 and the x-direction or 90° plane is illustrated by line 173. It can be seen that in the x-direction the beam angles of the emitted radiation are smaller than those in the y-direction, thus resulting in an asymmetric beam pattern wherein this pattern is stretched in the y-direction.

Figure 6:
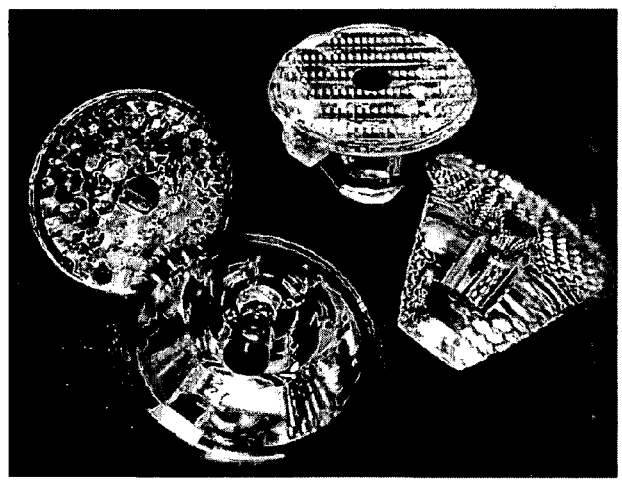
Figure 6:
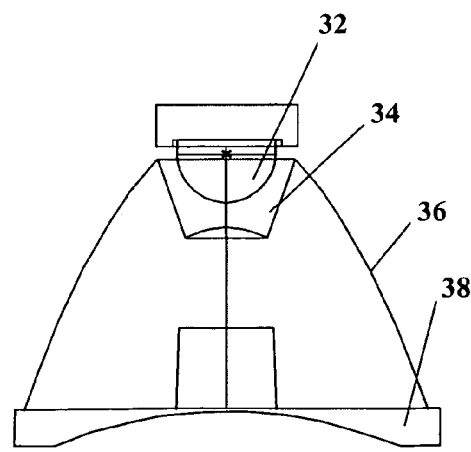
Figure 24:
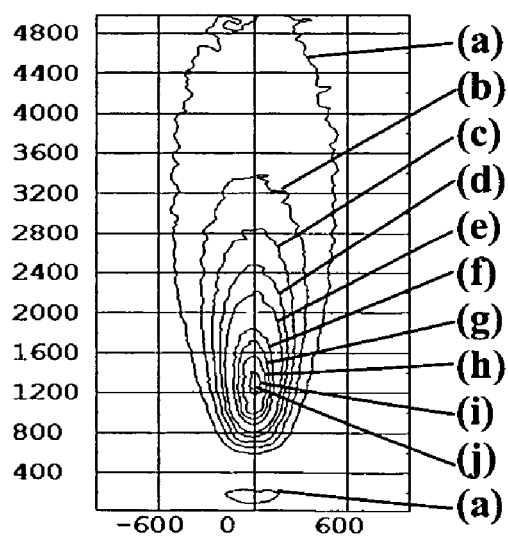
FIG. 24 shows the predicted illuminance distribution produced by a standard collimating optic with a flat exiting surface.
Figure 25:
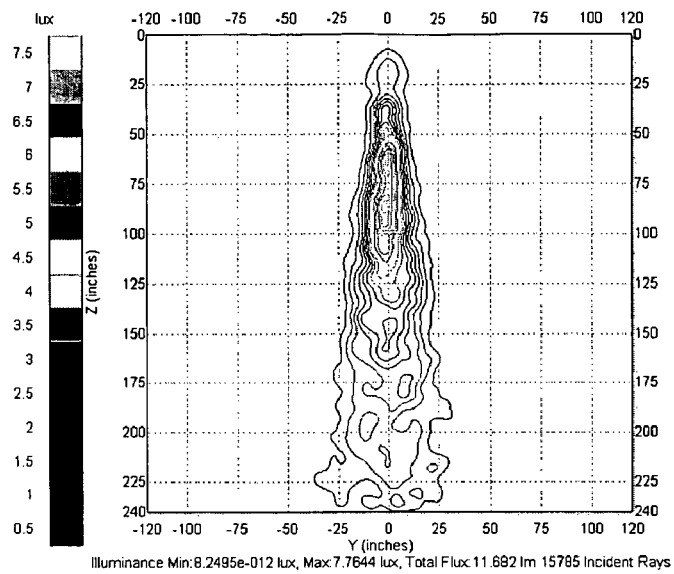
FIG. 25 shows the predicted illuminance distribution produced by a collimating optic in combination with Fresnel prisms.

FIG. 24 illustrates a Raytrace simulation for a standard collimating lens with a flat exiting surface such as that illustrated in FIG. 6a, and used for illuminating approximately a 15-foot distance perpendicular to the emitting surface of the luminaire. Curves (a) to (j) in FIG. 24 illustrate the illuminance results obtained for 5, 15, 25, 35, 45, 55, 65, 75, 85, 95, and 100 lux, respectively. As such the uniformity, defined as the ratio of the maximum to minimum flux is approximately 20:1. FIG. 25 illustrates a similar simulation for illumination predictions for one embodiment having a collimating lens and a Fresnel lens configuration as illustrated in FIG. 17 used for illuminating approximately a 15-foot distance. In this case a uniformity of 5:1 may be obtained. Based on this information, an improvement in uniformity of the illumination can be seen when using a combination of a first optical element and a second optical element as defined by the present invention.

In one embodiment of the present invention, light-emitting elements for use with the present invention include surface-mount type LED packages with radially symmetric beam angles of 110 to 120 degrees. In addition, the distance between the light-emitting elements and the lens can vary, however in one embodiment this distance can be approximately in the region of 5 mm.

Figure 16:
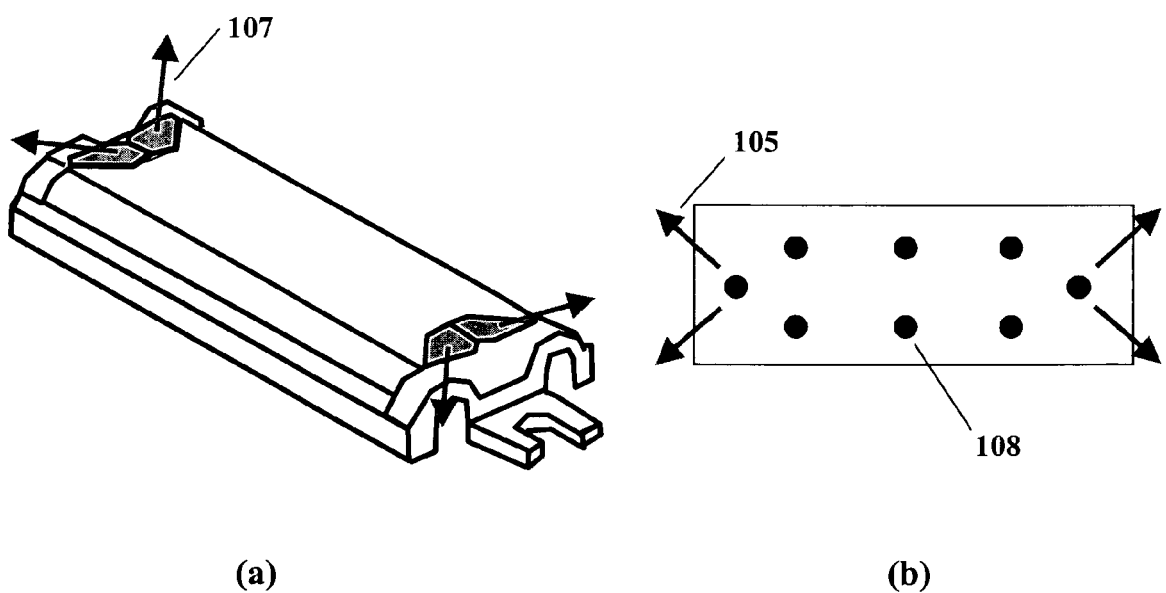
Figure 26:
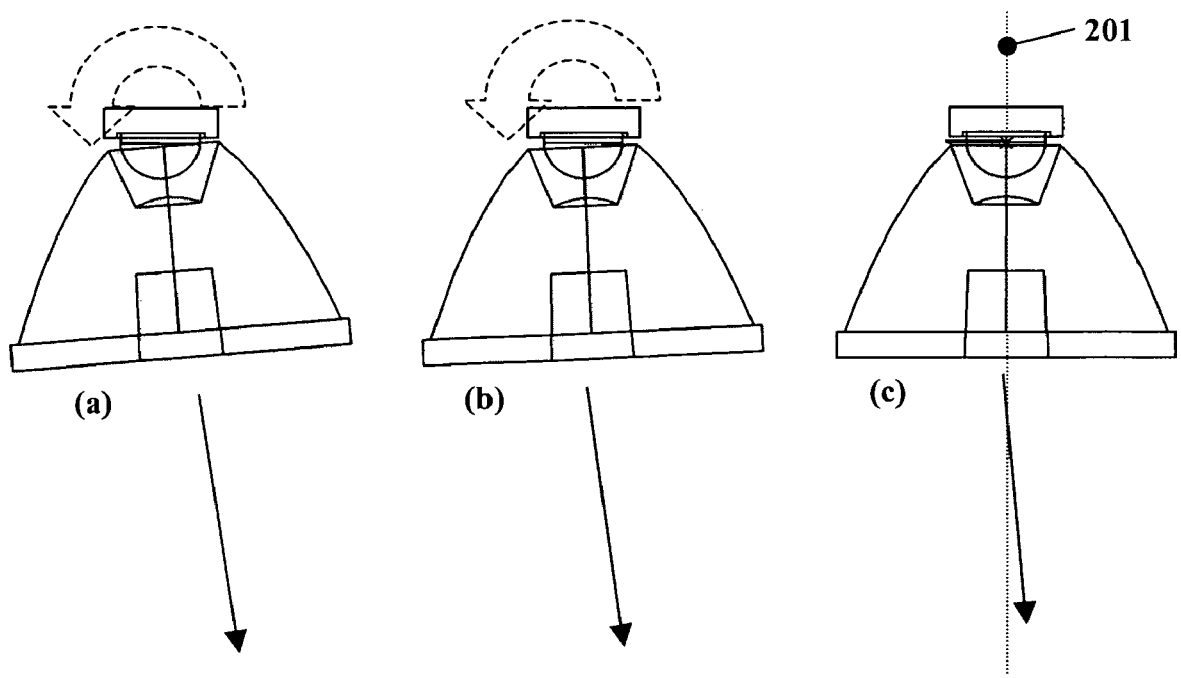
FIG. 26 shows one embodiment of the present invention in which the first and second optical elements are rotated together by varying degrees.

In one embodiment of the present invention, a series of light-emitting elements can be used as illustrated in FIG. 26 where the first and second optical elements used are those as illustrated in FIG. 17. In this embodiment the first and second optical elements are rotated together about the light emitting element axis 201 that is perpendicular to the illumination emission direction, wherein only the optical elements are rotated and not the light emitting element itself. For example, as illustrated in FIG. 26c, the optical elements are not rotated, in FIG. 26b the optical elements are rotated slightly, and in FIG. 26a the optical elements are rotated to a greater degree. For small rotation angles, the beam distribution produced by the lenses rotates accordingly. A useful application of this embodiment, for example is in an array configuration for precisely controlling multiple sources of light-emitting elements to illuminate a wall uniformly. An advantage of this embodiment is that one type of first and second optical element can be used for all the light-emitting elements, rather than designing unique optical elements for each light emitting element. Similarly, this concept of optic rotation can be used together with the embodiments of the present invention as illustrated in FIGS. 19 and 16, for example.

In the above description, the first optical element has been described as providing beam spread reduction and the second optical element has been defined as providing beam spread increase. In other embodiments, however, the first optical element may provide beam spread increase and the second optical element may provide beam spread reduction. Therefore, beam spread increase may take place for all light-emitting elements in a given array of light-emitting elements, and beam spread reduction may take place for selected light-emitting elements of the given array. A worker skilled in the art would readily understand how to fabricate this configuration of the present invention. As an example use of this configuration and having particular regard to channel letters, one may wish to provide uniform distribution for short channel letters, for example the height/width of the letter is small. In addition, it would be obvious to one skilled in the art that arrays of light-emitting elements may replace instances where individual light-emitting elements are used in the present invention if desired.

The embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An apparatus for forming an asymmetric beam pattern for illumination generated by one or more light-emitting elements, the illumination being generated substantially in an emitting direction, said apparatus comprising:
    a first optical element optically connected with each of the one or more light-emitting elements generating illumination substantially in the emitting direction, said first optical element manipulating the illumination in a first direction, the first direction being in a plane normal to a center axis of the emitting direction;
    a second optical element optically connected with one or more predetermined light-emitting elements selected from the one or more light-emitting elements, said second optical element manipulating the illumination created by the one or more predetermined light-emitting elements in a second direction, the second direction being in the plane normal to the center axis of the emitting direction and different from the first direction, the second optical element increasing beam spread in the second direction;
    thereby forming an illumination beam pattern that is radially asymmetric about the center axis of the emitting direction.

2. The apparatus for forming an asymmetric beam pattern according to claim 1, wherein said first direction is perpendicular to said second direction.

3. The apparatus for forming an asymmetric beam pattern according to claim 1, wherein said first optical element manipulates the illumination prior to the second optical element.

4. The apparatus for forming an asymmetric beam pattern according to claim 1, wherein said first optical element manipulates the illumination subsequent to the second optical element.

5. The apparatus for forming an asymmetric beam pattern according to claim 1, wherein said second optical element has a cross sectional size larger than that of one of the light-emitting elements.

6. The apparatus for forming an asymmetric beam pattern according to claim 1, wherein said second optical element has a cross sectional size substantially similar to that of one of light-emitting elements.

7. The apparatus for forming an asymmetric beam pattern according to claim 1, wherein said first optical element is one or more optics selected from the group comprising lenticular lens, reflector, parabolic reflector, Fresnel lens and a pillow lens.

8. The apparatus for forming an asymmetric beam pattern according to claim 1, wherein said second optical element is one or more optics selected from the group comprising lenticular lens, toroidal shaped lens, TIR light guide, reflector, parabolic reflector and a Fresnel lens.

9. The apparatus for forming an asymmetric beam pattern according to claim 1, wherein said second optical element is a Fresnel lens having a surface, said surface comprising a series of concentric grooves.

10. The apparatus for forming an asymmetric beam pattern according to claim 1, wherein said second optical element is a Fresnel lens having a surface defined by quadrants, each quadrant of said surface comprising a series of arc shaped grooves.

11. The apparatus for forming an asymmetric beam pattern according to claim 1, wherein said beam pattern is rectangular or square 12. The apparatus for forming an asymmetric beam pattern according to claim 1, wherein said second optical element is formed comprising multiple Fresnel lenses, each Fresnel lens refracting the illumination to different levels 13. The apparatus for forming an asymmetric beam pattern according to claim 1, wherein said first optical element and second optical element are formed as an integrated unit.

14. The apparatus for forming an asymmetric beam pattern according to claim 1, further comprising a diffusive optic for manipulating the illumination subsequent to both the first optical element and said second optical element, said diffusive optic selected from the group comprising frosted glass, etched glass, plastic diffuser and holographically-mastered diffusion film.

15. The apparatus for forming an asymmetric beam pattern according to claim 1, wherein said first optical element is a parabolic reflector, said parabolic reflector comprising two or more surfaces having different tilt angles.

16. The apparatus for forming an asymmetric beam pattern according to claim 1, wherein said first optical element and said second optical element are rotated as a single unit relative to the one or more light-emitting elements.

17. The apparatus for forming an asymmetric beam pattern according to claim 1, wherein the apparatus includes light-emitting elements of varying colors.

18. The apparatus for forming an asymmetric beam pattern according to claim 1, wherein the apparatus includes an emitting surface, wherein the beam pattern on a surface perpendicular to the emitting surface has a uniformity of approximately 20:1.

19. The apparatus of claim 1, wherein the first optical element manipulates the illumination substantially in the direction and the second optical element manipulates the illumination substantially in the second direction and not the first direction.

20. An apparatus for forming an asymmetric beam pattern for illumination generated by one or more light-emitting elements, the illumination being generated substantially in an emitting direction, said apparatus comprising:
    a first optical lens optically connected with each of the one or more light-emitting elements generating illumination substantially in the emitting direction, said first optical element manipulating the illumination in a first direction, the first direction being in a plane normal to a center axis of the emitting direction;
    a second optical lens optically connected with one or more predetermined light-emitting elements selected from the one or more light-emitting elements, said second optical element manipulating the illumination created by the one or more predetermined light-emitting elements in a second direction, the second direction being in the plane normal to the center axis of the emitting direction and different from the first direction, the second optical element increasing beam spread in the second direction;

thereby forming an illumination beam pattern that is radially asymmetric about the center axis of the emitting direction.

21. The apparatus for forming an asymmetric beam pattern according to claim 20, wherein said first direction is perpendicular to said second direction.

* * * * *